United States Patent
Ishizaka et al.

(10) Patent No.: US 8,727,592 B2
(45) Date of Patent: May 20, 2014

(54) LIGHT SOURCE MODULE AND ELECTRONIC APPARATUS PROVIDED WITH SAME

(75) Inventors: Takuya Ishizaka, Osaka (JP); Kazuya Ikuta, Osaka (JP); Eiji Kurimoto, Osaka (JP); Sumito Nishioka, Osaka (JP); Keiji Sakai, Osaka (JP); Hirotsugu Matoba, Osaka (JP); Takeshi Takayama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 183 days.

(21) Appl. No.: 13/519,523

(22) PCT Filed: Aug. 4, 2010

(86) PCT No.: PCT/JP2010/063219
§ 371 (c)(1),
(2), (4) Date: Jun. 27, 2012

(87) PCT Pub. No.: WO2011/125239
PCT Pub. Date: Oct. 13, 2011

(65) Prior Publication Data
US 2012/0287670 A1 Nov. 15, 2012

(30) Foreign Application Priority Data

Apr. 9, 2010 (JP) .................................. 2010-090912

(51) Int. Cl.
*G02F 1/1335* (2006.01)
*F21V 33/00* (2006.01)
*H05K 5/00* (2006.01)

(52) U.S. Cl.
USPC ........... 362/606; 362/613; 362/615; 362/616; 362/632

(58) Field of Classification Search
CPC .. G02B 6/0078; G02B 6/0088; G02B 6/0091; G02B 6/009
USPC .......................... 362/606, 613, 615, 616, 632
See application file for complete search history.

(56) References Cited

U.S. PATENT DOCUMENTS 7,490,973 B2 * 2/2009 Fujikawa et al. ............. 362/634
2001/0050731 A1 * 12/2001 An et al. ......................... 349/58

(Continued)

FOREIGN PATENT DOCUMENTS

JP          07-036034        2/1995
JP          2005-312177      11/2005

(Continued)

OTHER PUBLICATIONS

International Search Report dated Nov. 16, 2010 for PCT/JP2010/063219.

*Primary Examiner* — Stephen F Husar
*Assistant Examiner* — James Cranson, Jr.
(74) *Attorney, Agent, or Firm* — Edwards Wildman Palmer LLP; David G. Conlin; Steven M. Jensen (57) ABSTRACT

A light source module of the present invention is configured such that there is a through hole (23) in one longitudinal end portion of a light guide (21) that constitutes a light guide plate, into which through hole (23) a positioning pin (24) for positioning an LED light source (12) and the light guide (21) fits. Further, a guide (9) is provided to the other end portion of the light guide (21), which guide (9) restrains the light guide (21) in a direction of a short side but does not restrain the light guide (21) in a direction of a long side. This makes it possible to provide a light source module that can reduce warping and cracking caused by expansion of a light guide, and an electronic apparatus including the light source module.

10 Claims, 8 Drawing Sheets

(56) References Cited

U.S. PATENT DOCUMENTS

| | | |
|---|---|---|
| 2005/0270796 A1 | 12/2005 | Ichikawa et al. |
| 2006/0203515 A1* | 9/2006 | Fujikawa et al. ............. 362/615 |
| 2008/0030650 A1 | 2/2008 | Kitagawa et al. |
| 2009/0273732 A1* | 11/2009 | Shimura et al. ................ 349/65 |

FOREIGN PATENT DOCUMENTS

| | | |
|---|---|---|
| JP | 2005-347214 | 12/2005 |
| JP | 2007-184291 | 7/2007 |
| JP | 2008-034372 | 2/2008 |
| JP | 2010-097908 | 4/2010 |

* cited by examiner

LIGHT SOURCE MODULE AND ELECTRONIC APPARATUS PROVIDED WITH SAME

TECHNICAL FIELD

The present invention relates to (i) a light source module for use in a backlight of for example a liquid crystal display device, which backlight includes, for the purpose of reducing the thickness, a side edge-type (also called side light) light guide plate for emitting light from a light source in the form of a plane and (ii) an electronic apparatus including the light source module.

BACKGROUND ART

In recent years, there have been many liquid crystal display devices each employing a backlight that includes, for the purpose of reducing the thickness, a side edge-type (also called side light) light guide plate for emitting light from a light source in the form of a plane.

Figure 11:
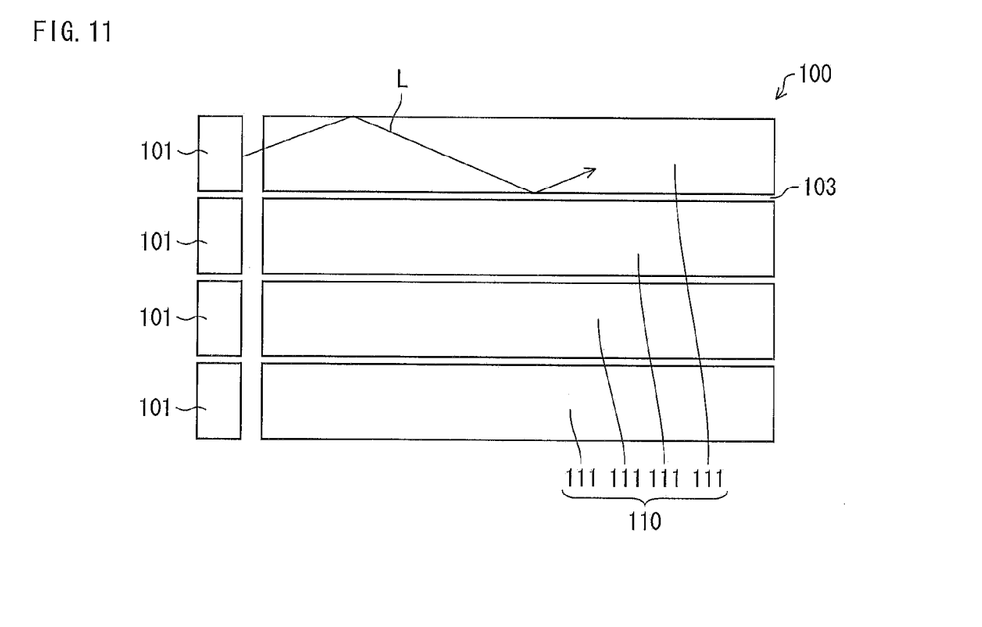
FIG. 11 is a plan view illustrating a lighting device including a light source module described in Patent Literature 1.

Patent Literature 1 discloses a lighting device, which is an example of such a side edge-type light guide plate. FIG. 11 is a plan view illustrating the lighting device of Patent Literature 1. As illustrated in FIG. 11, a lighting device 100 disclosed in Patent Literature 1 includes (i) a light guide plate 110 constituted by a plurality of light guides 111 arranged in a line and (ii) a plurality of light sources 101 provided so as to correspond to the respective light guides 111 of the light guide plate 110 and emit light to the light guides 111. On the bottom side of the light guide plate 110, there is provided a reflection sheet (not illustrated). Further, there is a gap 103 between adjacent ones of the light guides 111, which gap is made up of an air layer of 0.1 µm or larger. This configuration makes it possible to carry out a preliminary impulse display.

However, in a case of using such a side-edge type light guide plate, it is difficult to fasten the side edge-type light guide plate.

Figure 12:
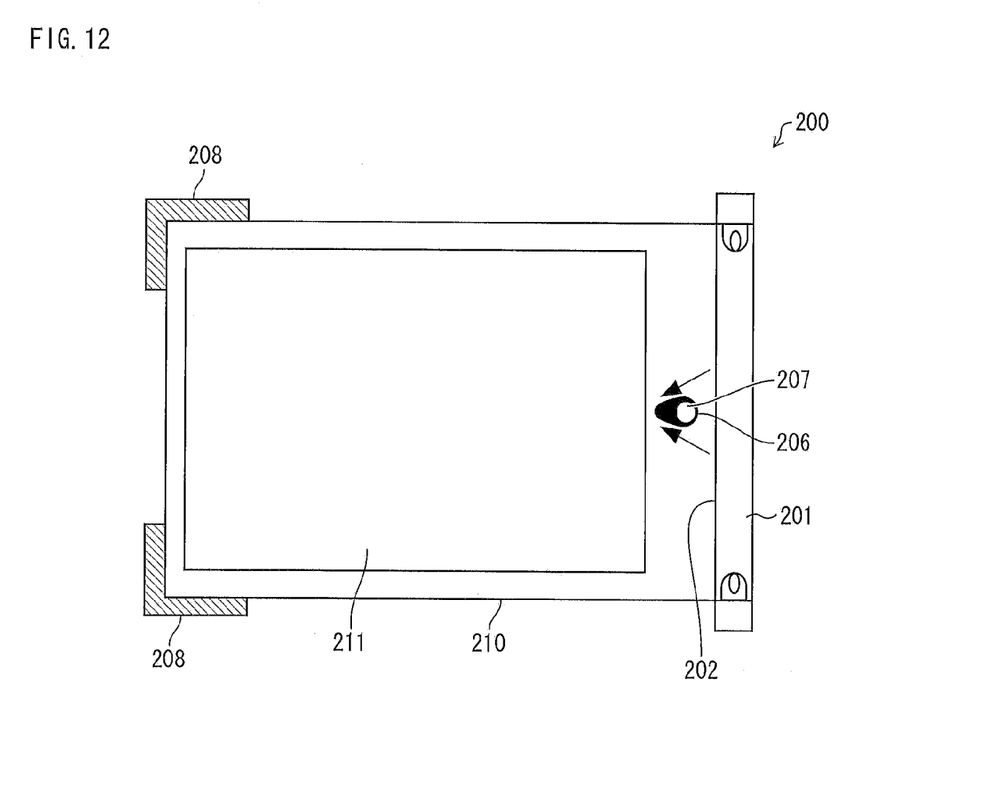
FIG. 12 is a plan view illustrating an attachment structure for attaching a light guide in a lighting device including a light source module described in Patent Literature 2.

In view of the circumstances, Patent Literature 2 discloses an attachment structure for a light guide plate, which is an example of how to fasten a side edge-type light guide plate. FIG. 12 is a plan view illustrating the attachment structure for attaching a light guide plate 210 in a lighting device 200 of Patent Literature 2. As illustrated in FIG. 12, the attachment structure for the light guide plate 210 disclosed in Patent Literature 2 is such that, in the lighting device 200 configured such that light emitted from the light source 201 enters a single light guide plate 210, a small positioning hole 206, which is in a light introduction frame 202 of the light guide plate 210, and a boss 207, which is provided to an attachment base (not illustrated) to which the light guide plate 210 is to be attached, fit together. According to this configuration, a light introduction frame 202-side portion of the light guide plate 201 is positioned with respect to the light source 201. This makes it possible to reduce luminance unevenness. Further, by providing the boss 207 on a perpendicular bisector of the light introduction frame 202, a luminance uneven area is canceled out by light that comes diagonally from the left and the right. This makes it possible to effectively use a large part of the light guide plate 210 as a light emitting area 211.

CITATION LIST

Patent Literatures

Patent Literature 1
Japanese Patent Application Publication, Tokukai, No. 2008-34372 A (Publication Date: Feb. 14, 2008)

Japanese Patent Application Publication, Tokukaihei, No. 7-36034 A (Publication Date: Feb. 7, 1995)

SUMMARY OF INVENTION

Technical Problem

However, employing the method of fastening the light guide plate 210 described in Patent Literature 2 causes a problem such as warping or cracking of a light guide plate.

Specifically, according to Patent Literature 2, the light introduction frame 202 of the light guide plate 210 is positioned with respect to the light source 201 so as to be in tight contact with the light guide 201, with the boss 207 fitting in the small positioning hole 201 of the light guide plate 201. In addition, under this condition, corners opposite the light introduction frame 202 are positioned with use of positioning ribs 208. In this way, the light guide plate 210 according to Patent Literature 2 is held in place by restraining movements of both longitudinal ends of the light guide plate 210. Accordingly, it is essential for Patent Literature 2 to include, in order to hold the light guide plate 201 in place, the small positioning hole 206, the boss 207, and the positioning ribs 208.

Fastening the light guide plate 210 in this manner makes it possible to arrange the light source 201 and the light guide plate 210 at a constant distance from each other. However, in this case, one end portion (light introduction frame 202-side) of the light guide plate 210 is in tight contact with the light source 201, and the corners of the other end portion are in tight contact with the alignment ribs 208. Therefore, if the light guide plate 210 expands due to temperature changes and/or moisture absorption, the light guide plate 210 warps or cracks.

On the other hand, according to Patent Literature 1, the light guide plate 110 is constituted by a plurality of light guides 111. Therefore, the width of each of the light guides 111 in a direction of a short side is much smaller than that of a single light guide plate 201 described in Patent Literature 2. This makes it is difficult to fasten the light guide plate 110, i.e., to fasten each of the light guides 111.

Patent Literature 1 discloses providing hollow light guides (not illustrated) on both longitudinal ends of each of the light guides 111. However, the hollow light guides merely guide light emitted from the light sources 101 to their corresponding light guides 111. That is, the hollow light guides are not the ones that fasten the light guides 111. As is clear from this, Patent Literature 1 does not at all disclose a method of fastening light guides.

Under such circumstances, it is possible to consider employing the method of fastening the light guide plate 210 of Patent Literature 2 in order to fasten the light guides 111 of Patent Literature 1. However, when the method of Patent Literature 2 is used in combination with Patent Literature 1, as described earlier, if the light guides 111 expand due to temperature changes and/or moisture absorption, the light guides 111 warp or crack.

The present invention has been made in view of the above problems of conventional techniques, and an object of the present invention is to provide (i) a light source module capable of reducing warping and cracking caused by expansion of a light guide plate and (ii) an electronic apparatus including the light source module.

Solution to Problem

In order to attain the above object, a light source module of the present invention includes: a light source section including a light source; and a light guide plate for receiving a light beam from the light source through an end face and guiding the light beam, the light guide plate having a positioning part for positioning the light source and the light guide plate, the light source module further including a restraining part for restraining the light guide plate only in a direction of a short side.

According to the configuration, since there is the positioning part in the light guide plate, the light guide plate is fastened by the positioning part. Therefore, it is possible to keep the distance between the light source and the light guide plate constant. This makes it possible to improve optical coupling efficiency of the light source to the light guide plate. Further, the restraining part restrains only movement in the direction of the short side of the light guide plate, and does not restrain movement in the direction of the long side of the light guide plate. This makes it possible, even if the light guide plate expands due to temperature changes and/or moisture absorption, to reduce the effects of such expansion. As such, it is possible to provide a light source module capable of reducing warping and cracking caused by expansion of a light guide plate.

In order to attain the above object, an electronic apparatus of the present invention includes any of the light source modules.

According to this invention, it is possible to provide an electronic apparatus including a light source module capable of reducing warping and cracking caused by expansion of a light guide plate.

Advantageous Effects of Invention

As has been described, a light source module of the present invention is configured such that (i) the light guide plate has a positioning part for positioning the light source and the light guide plate and (ii) a restraining part is provided to a longitudinal end portion of the light guide plate, which restraining part restrains only movement in a direction of a short side of the light guide plate. Further, as described above, an electronic apparatus of the present invention includes the light source module. As such, it is possible to provide (a) a light source module capable of reducing warping and cracking caused by expansion of a light guide plate and (b) an electronic apparatus including the light source module.

For a fuller understanding of other objects, the nature and advantages of the invention, reference should be made to the ensuing detailed description taken in conjunction with the accompanying drawings.

BRIEF DESCRIPTION OF DRAWINGS

FIG. 5

(a) to (c) of FIG. 5 are plan views each illustrating an end portion of a light guide and a light source of the light source module.

FIG. 7

(a) of FIG. 7 is a plan view illustrating part of the light source module. (b) of FIG. 7 is a graph showing a relationship between the rate of decrease of luminance at the center of a light guide shown in (a) of FIG. 7 and the diameter of a through hole shown in (a) of FIG. 7.

FIG. 8

(a) of FIG. 8 is a plan view illustrating part of the light source module. (b) of FIG. 8 is a graph showing a relationship between the rate of decrease of luminance at the center of a light guide shown in (a) of FIG. 8 and the diameter of a through hole shown in (a) of FIG. 8.

FIG. 9

(a) of FIG. 9 is a plan view illustrating part of the light source module. (b) of FIG. 9 is a graph showing a relationship between an end face of a light source shown in (a) of FIG. 9 on a side on which no positioning pin is provided and an LED light source shown in (a) of FIG. 9.

FIG. 10

(a) of FIG. 10 is a plan view illustrating part of the light source module. (b) of FIG. 10 is a graph showing a relationship between (i) the rate of decrease of luminance at the center of the light guide shown in (a) of FIG. 10 along the direction of the long side and (ii) the distance between the LED light source and the light guide shown in (a) of FIG. 10.

DESCRIPTION OF EMBODIMENTS

Embodiment 1

Figure 2:
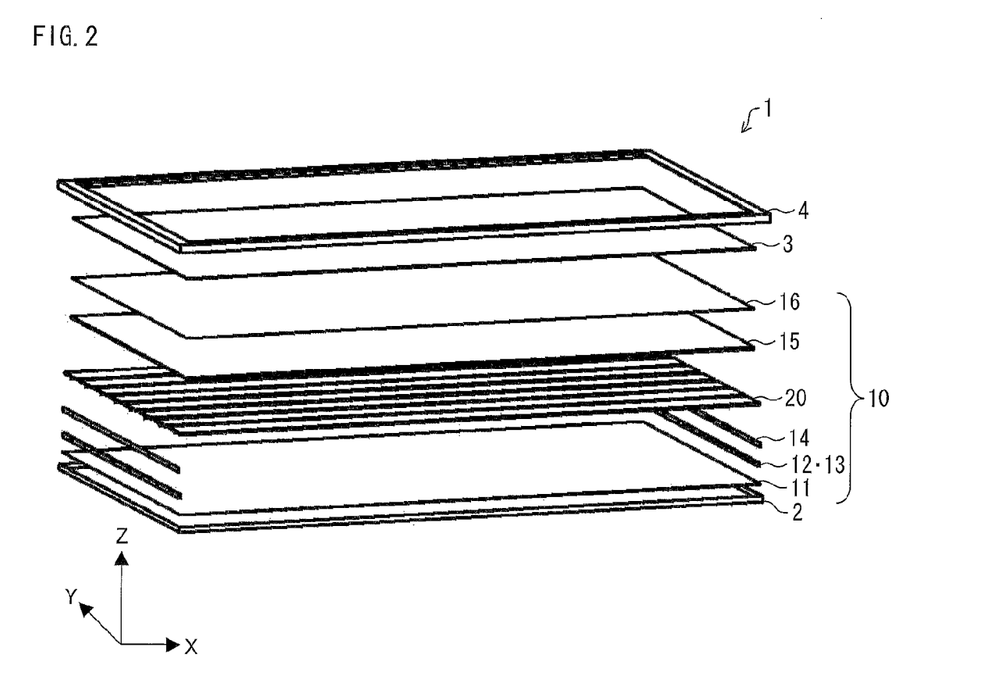
FIG. 2 is an exploded perspective view illustrating a configuration of a liquid crystal display device including the light source module.

The following description discusses one embodiment of the present invention with reference to FIGS. 1 to 10. FIG. 2 is an exploded perspective view illustrating a liquid crystal display device (electronic apparatus) 1 including a light source module of the present embodiment.

As illustrated in FIG. 2, the liquid crystal display device 1 includes a chassis (housing) 2, a light source module 10, a liquid crystal panel 3, and a bezel 4, which are arranged in this order from the bottom. The light source module 10 is constituted by: a reflection sheet 11 serving as a reflection plate; an LED light source 12 and a circuit board 13, which LED light source 12 is constituted by a plurality of LEDs (light emitting diodes) each serving as a light source; a reflector 14; a light guide plate 20; a diffusing plate 15; and an optical sheet group 16.

The LED light source 12 can be constituted by arranging LEDs of three primary colors of RGB or can be constituted by arranging a plurality of white LEDs. The LED light source 12 is aligned, in a widthwise direction (direction of a short side) of the light guide plate 20, along an end face of the light guide plate 20. The number of the LEDs that constitute the LED light source 12 is not particularly limited, provided that the necessary amount of light that a light source should emit is obtained.

The light guide plate 20 has a light path changing structure for emitting, through a light output surface, a light beam emitted from the LED light source 12 and entered the light guide plate 20 through at least one end face facing in a direction of a long side. That is, the light guide plate 20 receives the light beam from the LED light source 12 through its end face(s) and guides the light beam.

The reflector 14 is provided around the LED light source 12. The reflector 14 improves optical coupling efficiency of light from the LED light source 12 to the light guide plate 20.

The optical sheet group 16 can be omitted from the present invention.

Figure 3:
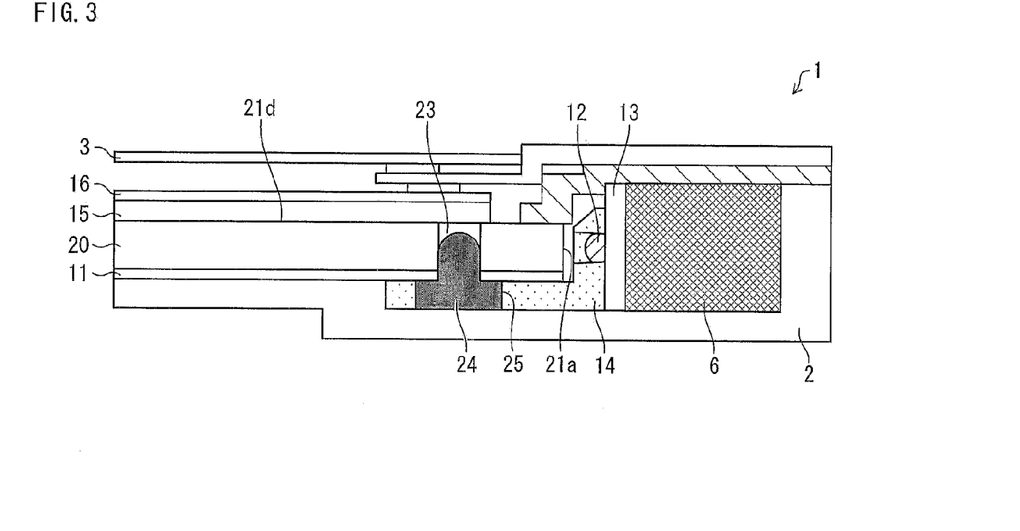
FIG. 3 is a cross-sectional view illustrating a configuration of part of the liquid crystal display device including the light source module.

FIG. 3 is a cross-sectional view illustrating a configuration of part of the liquid crystal display device 1 including the light source module 10. As illustrated in FIG. 3, the LED light source 12 and the circuit board 13, and the reflector 14 are provided to an end portion of the light guide plate 20. This allows light from the LED light source 12 to (i) enter the light guide plate 20 through one end face 21a, (ii) travel out of the light guide plate 20 through an emission surface (light output surface) 21d, and then (iii) pass through the diffusing plate 15 and the optical sheet group 16 and strike the liquid crystal panel 3. That is, the light source module 10 of the present embodiment employs a side edge (also called side light) system. Note that part of the light travels out of the light guide plate 20 through surfaces other than the emission surface 21d. However, the reflection sheet 11 is provided on a surface of the light guide plate 20, which surface is other than the emission surface 21d and a surface along which the LED light source 12 is provided. Therefore, light traveling out through the surface on which the reflection sheet 11 is provided reenters the light guide plate 20. Accordingly, most of the light is emitted from the emission surface 21d.

Further, there is a through hole 23 in the end portion of the light guide plate 20. The chassis 2 has a positioning pin (protruding part) 24 provided thereon, which positioning pin 24 fits in the through hole 23. This fastens the light guide plate 20 to the chassis 2. That is, this enables alignment between the LED light source 12 and the light guide plate 20. Note that the positioning pin 24 is made from a light absorber.

According to the present embodiment, the positioning pin 24 provided to the chassis 2 not only fits in the through hole 23 of the light guide plate 20. The reflector 14 is fastened to the LED light source 12, and the bottom of the positioning pin 24 fits in a through hole (groove) 25 of the reflector 14. This makes it possible to easily enable alignment between the LED light source 12 and the light guide plate 20.

The LED light source 12 is provided so as to face the end face 21a of the light guide plate 20. Further, the LED light source 12, the circuit board 13 on which the LED light source 12 is provided, and the reflector 14 are fastened to a light source block 6. That is, a light source section is constituted by the LED light source 12, the circuit board 13, the reflector 14 and the light source block 6 which are integral with one another. This makes it possible to fasten the LED light source 12, the circuit board 13 and the reflector 14 to the chassis 2 while improving discharge characteristics of LEDs.

Figure 6:
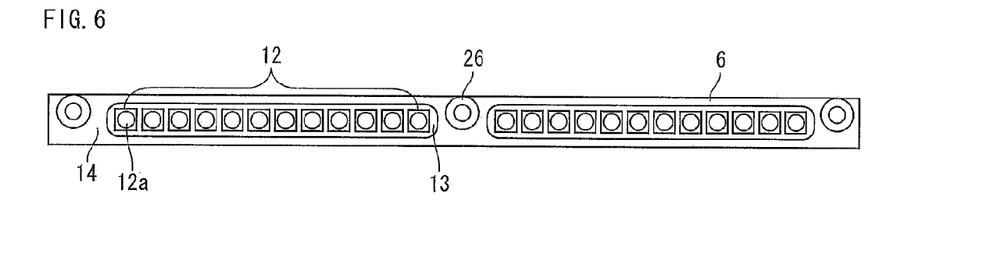
FIG. 6 is a plan view illustrating an emission surface of a light source section of the light source module.

The following description discusses, with reference to FIG. 6, an example of the light source section of the light source module 10. FIG. 6 is a plan view illustrating an emission surface of the light source section of the light source module 10. The LED light source 12 is constituted by a plurality of LEDs 12a . . . . For the purpose of fastening the LED light source 12 to the chassis 2, the circuit board 13 on which the LEDs 12a . . . are provided, the reflector 14 which is provided so as to surround the LED light source 12 and to improve coupling efficiency between the LED light source 12 and a light guide 21, are fastened to the light source block 6. This can be achieved by (i) arranging the reflector 14, the circuit board 13 and the light source block 6 in this order and (ii) fastening the reflector 14 and the circuit board 13 to the light source block 6 with a fastener 26 inserted from the reflector 14 side. Further, according to the present embodiment, two LED light sources 12 spaced from each other are provided to a single light source block 6. That is, the light source section is divided into two light source groups. Then, a hole necessary for the fastener 26 for fastening is made between the LED light sources 12. This makes it possible to fasten the LED light sources 12 to the light source block 6 without interfering with the LED light sources 12 and the light guide 21. The larger the number of points where the circuit board 13 on which the LEDs 12a . . . are provided is fastened to the light source block 6, the better the heat transmission will be. In addition, according to the configuration of FIG. 6, not only a space between light guides 21 but also a space between the separated LED light sources 12 is fastened with the fastener 26. This makes it possible to transfer heat generated from the LED 12a efficiently to the light source block 6, and further to the chassis 2. Accordingly, photoconversion efficiency of the LED 12a is improved.

The light source block 6 is fastened to the chassis 2 in such a manner that (i) the positioning pin 24 of the chassis 2 is fitted into the through hole 25 of the reflector 14 and thereafter (ii) the light source block 6 is fastened to the chassis 2. Since the positioning pin 24 of the chassis 2 fits in the through hole 25 of the reflector 14, the LED light source 12 and the positioning pin 24 are aligned with each other. Then, by fitting the positioning pin 24 into the through hole 23 of the light guide plate 20, the LED light source 12 and the light guide plate 20 are aligned with each other.

Further, for example, the LED light source 12 can be fastened to the chassis 2 in such a manner that (i) a frame (not illustrated) is provided to the chassis 2 and (ii) the frame and the positioning pin 24 are aligned with each other. This also enables positioning of the LED light source 12 and the light guide plate 20. Note that it is necessary to place the diffusing plate 15 and the optical sheet group 16 on the top face of the light guide plate 20. Therefore, by configuring the positioning pin 24 such that it does not protrude out of the surface of the light guide plate 20, the top face can be used more freely.

Meanwhile, according to the liquid crystal display device 1, blurring occurs in moving images as compared to a CRT (cathode-ray tube) display device. Specifically, the CRT display device does not cause much feeling of afterimage, because a non-light-emitting period during which a pixel does not emit light is provided between a light-emitting period of the pixel in one frame and another light-emitting period of the pixel in the next frame. In contrast, the liquid crystal display device 1 employs a display system called "hold type system", in which such a non-light-emitting period is not provided. Therefore, afterimages occur and such afterimages are perceived by a user as blurring of moving images.

In view of this, for a backlight-type liquid crystal display device 1, there has been proposed a backlight blinking, which is a technique by which to insert a black display between image displays by (i) dividing the light source module 10, which is a backlight, into light sources and (ii) sequentially turning OFF the light sources in synchronization with timings at which video signals are applied to the liquid crystal panel 3. This makes it possible to realize a preliminary impulse display, to reduce afterimages, and to reduce power consumption.

Figure 4:
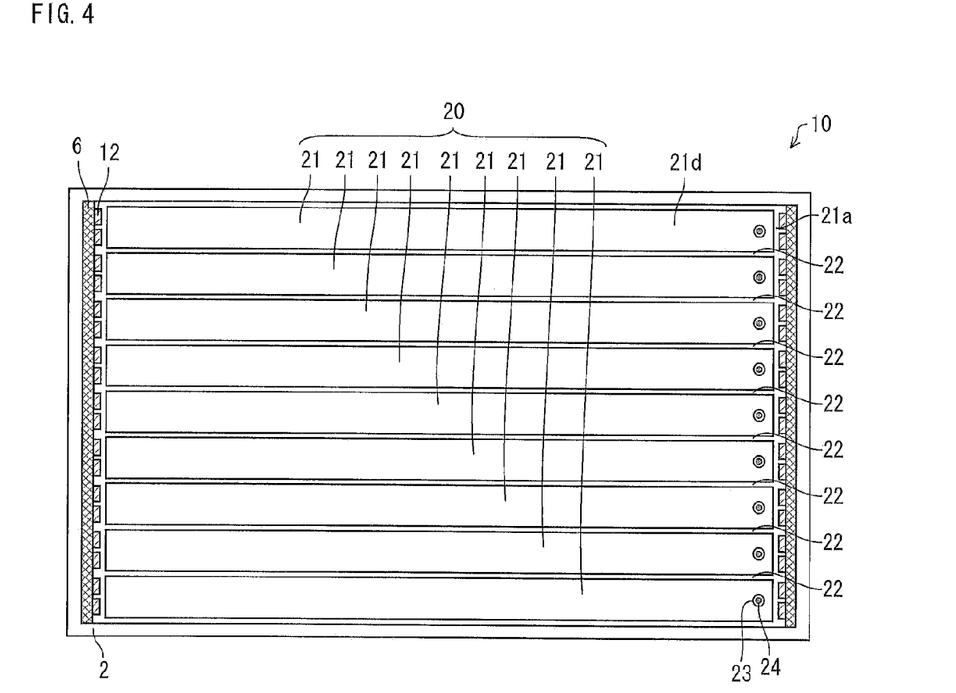
FIG. 4 is a plan view illustrating a configuration of the light source module.

FIG. 4 is a plan view illustrating a configuration of the light source module 10. In order to carry out the backlight blinking, the light source module 10 of the present embodiment is configured such that, as illustrated in FIG. 4, the light guide plate 20 is constituted by a plurality of separated light guides 21 . . . , and the light guides 21 . . . are arranged with gaps 22 between them in parallel with the direction of the long side.

The light guides 21 ... are equally spaced. LED light sources 12 provided on light source blocks 6 are placed so as to face both end faces of each of the light guides 21. The light guide plate 20, the light source blocks 6, and the LED light sources 12 are accommodated in the chassis 2.

According to the present embodiment, as illustrated in FIG. 4, the LED light sources 12 are provided so that light beams emitted therefrom enter a corresponding light guide 21 through both end faces 21a facing in the direction of the long side. This makes it possible to provide a higher-luminance light source module 10 as compared to the one in which light from an LED light source 12 enters a light guide 21 through only one end face 21a. Note that light does not necessarily have to enter a light guide 21 through both end faces 21a facing in the direction of the long side, and can enter the light guide 21 through only one of the end faces 21a facing in the direction of the long side. That is, according to the present invention, it is only necessary that light enter a light guide 21 through at least one end faces 21a.

The light guide plate 20 is configured such that a plurality of light guides 21 are provided all over the chassis 2 so as to correspond to the size of the chassis 2, i.e., to the size of a screen. The light guides 21 are made from a material such as acrylic resin. Further, each of the light guides 21 can be a bar-shaped light guide having a rectangular cross section or a T-shaped cross section.

Note, here, that an electronic apparatus such as the liquid crystal display device 1 including the light source module 10 is expected to be used in various places. Therefore, the light guides 21 may expand due to changes in external environments such as temperature changes and/or moisture absorption. In particular, the light source module 10 is configured such that light enters the light guides 21 through both end faces 21a facing in the direction of the long side. Therefore, the lengths in the direction of the long side of the light guides 21 are likely to change more significantly than the lengths in the direction of the short side of the light guides 21. For example, in a case of a large television 60 inches in size, the length of each of the light guides 21 in the direction of the long side changes by approximately 2 mm when the temperature changes by 20° C. This causes warping and/or cracking on the light guides 21.

Figure 1:
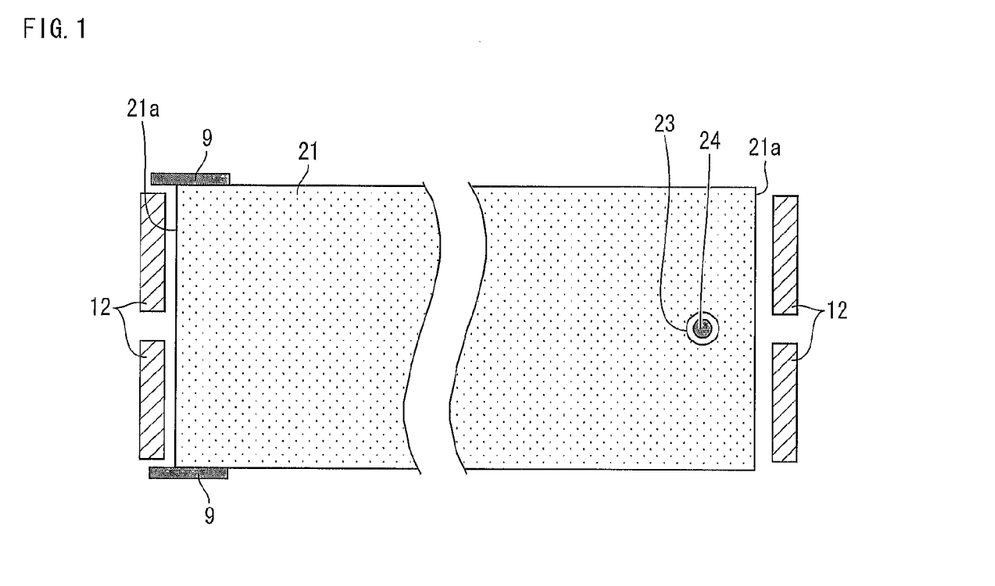
FIG. 1 is a plan view illustrating end portions and surrounding areas of a light guide of a light source module of the present invention.

In view of this, the present embodiment is designed so as to prevent warping and cracking on the light guide plate 20 (light guides 21). The following description discusses this design with reference to FIG. 1. FIG. 1 is a plan view illustrating end portions and surrounding areas of a light guide 21 of the light source module 10.

According to the present embodiment, as illustrated in FIG. 1, there is a through hole 23 in one longitudinal end portion of the light guide 21, and a guide (restraining part) 9 is provided to the other longitudinal end portion of the light guide 21 along the direction of the long side.

As described earlier, the positioning pin 24 of the chassis 2 fits in the through hole 23 in the one end portion of the light guide 21. This fastens the light guide to the chassis 2. That is, this enables alignment between the LED light source 12 and the light guide plate 20. Further, since the positioning pin 24 fits in the through hole 23, the distance between an LED light source 12 and the light guide 21 does not change significantly even if a change (especially temperature change) occurs in external environments. Accordingly, it is possible to keep the distance between the LED light source 12 and the light guide 21 constant. This makes it possible to reduce variations in optical coupling efficiency of LED light sources 12 to the light guide 21.

On the other hand, the guide 9 provided to the other end portion of the light guide 21 holds a side face facing in the direction of the short side of the light guide 21. Further, the guide 9 is provided so as to protrude out from the light guide 21 toward an LED light source 12 side. The guide 9 restrains the light guide 21 only in the direction of the short side. Further, the light guide 21 and the LED light source 12 are provided at a distance from each other. This makes it possible, even if the light guide 21 expands due to a change in external environments, to sufficiently absorb (tolerate) the expansion of the light guide 21. In particular, it is possible to address thermal expansion of the light guide 21, which is a problem for a large-size television. Accordingly, it is possible to prevent the light guide 21 from being broken due to thermal expansion etc. That is, it is possible to improve reliability against changes in external environments such as temperature increase.

Although the light guide plate 20 of the light source module 10 is constituted by a plurality of light guides 21 obtained by dividing the light guide plate 20 into strips, the light guide plate 20 can be constituted by a single flat plate. Note, however, that constituting the light guide plate 20 by a plurality of light guides 21 makes it possible to reduce the effects of thermal expansion in the direction of the short side of the light guide plate 20, as compared to the case where the light guide plate 20 is constituted by a single flat plate. Accordingly, constituting the light guide plate 20 by a plurality of light guides 21 makes it possible to easily restrain the light guide plate 20 in the direction of the short side.

As has been described, the light source module 10 is configured such that the light guides 21 are fastened with the positioning pins 24 fitting in the through holes 23 of the light guides 21. Therefore, it is possible to keep the distance between the LED light sources 12 and the light guides 21 constant. This makes it possible to improve optical coupling efficiency of the LED light sources 12 to the light guides 21. Further, guides 9 restrain only movement in the direction of the short side of the light guides 21, and do not restrain movement in the direction of the long side of the light guides 21. This makes it possible, even if the light guides 21 expand due to temperature change and/or moisture absorption, to reduce the effects of the expansion. Accordingly, it is possible to provide a light source module 10 capable of reducing warping and cracking caused by expansion of the light guides 21. As such, it is possible to provide a light source module 10 that has both reliability and high efficiency of light use.

Although the light source module 10 is configured such that a through hole 23 is in one end portion of a light guide 21, where to make the through hole 23 is not particularly limited. This is because the light guide 21 can be fastened as long as there is a through hole 23 in the light guide 21. Note however that, under the condition where thermal expansion of the light guide 21 may occur due to a change in external environments (especially temperature change), the through hole 23 is preferably in one end portion of the light guide 21, and is more preferably in an end portion opposite the end portion where a guide 9 is provided. That is, it is preferable that (i) an end portion where the positioning pin 24 fits in the through hole 23 to fasten the light guide 21 and (ii) an end portion where the guide 9 is provided to restrain the light guide 21 in the direction of the short side be opposite end portions (see FIG. 1). This makes it possible to provide a light source module 10 that has both reliability and high efficiency of light use.

Further, how to configure and where to provide the guide 9 are not particularly limited, provided that the guide 9 restrains the light guide 21 in the direction of the short side, holds the light guide 21 so that the light guide 21 does not become misaligned, and does not restrain the light guide 21 in the direction of the long side. The guide 9 can be provided to for example the chassis 2, to the light block 6 to which an LED light source 12 corresponding to the other end portion of the light guide is fastened, or to the reflector 14. For example, although FIG. 1 illustrates the guide 9 in the form of a linear rib, the guide 9 can be a columnar guide such as a pin.

Further, it is only necessary that the guide 9 be provided to, out of the both longitudinal end portions of the light guide 21, an end portion (i.e., the other end portion) that is different from the end portion where there is the through hole 23. According to this configuration, the positioning pin 24 and the through hole 23 restrain (fasten) one end portion, while the effects of expansion of the light guide 21 in the direction of the long side is reduced by the guide 9 in the other end portion. This makes it possible to maintain good optical coupling efficiency and to reduce variations in optical coupling efficiency.

Further, the guide 9 can be provided on the emission surface (light output surface) 21d instead of being provided to an end portion of the light guide 21. In this case, care should be taken so that no luminance unevenness occurs in the emission surface 21d due to the structure of the guide 9. The guide 9 can be structured so as to reduce the displacement of the light guide module 10 in a direction in which light is outputted. In this case, since the light guide 21 is fastened in the direction in which light is outputted, displacement in the direction in which light is outputted and in the direction of the short side is restrained. This makes it possible to further reduce backlash, deformation and warping of the light guide 21. Further, a plurality of guides 9 can be arranged in the direction of the long side of the light guide 21. In this case, since the number of points where the light guide 21 is held in the direction of the short side is larger than the case where a single guide 9 is provided, it is possible to further reduce deformation and warping of the light guide 21.

Figure 10:
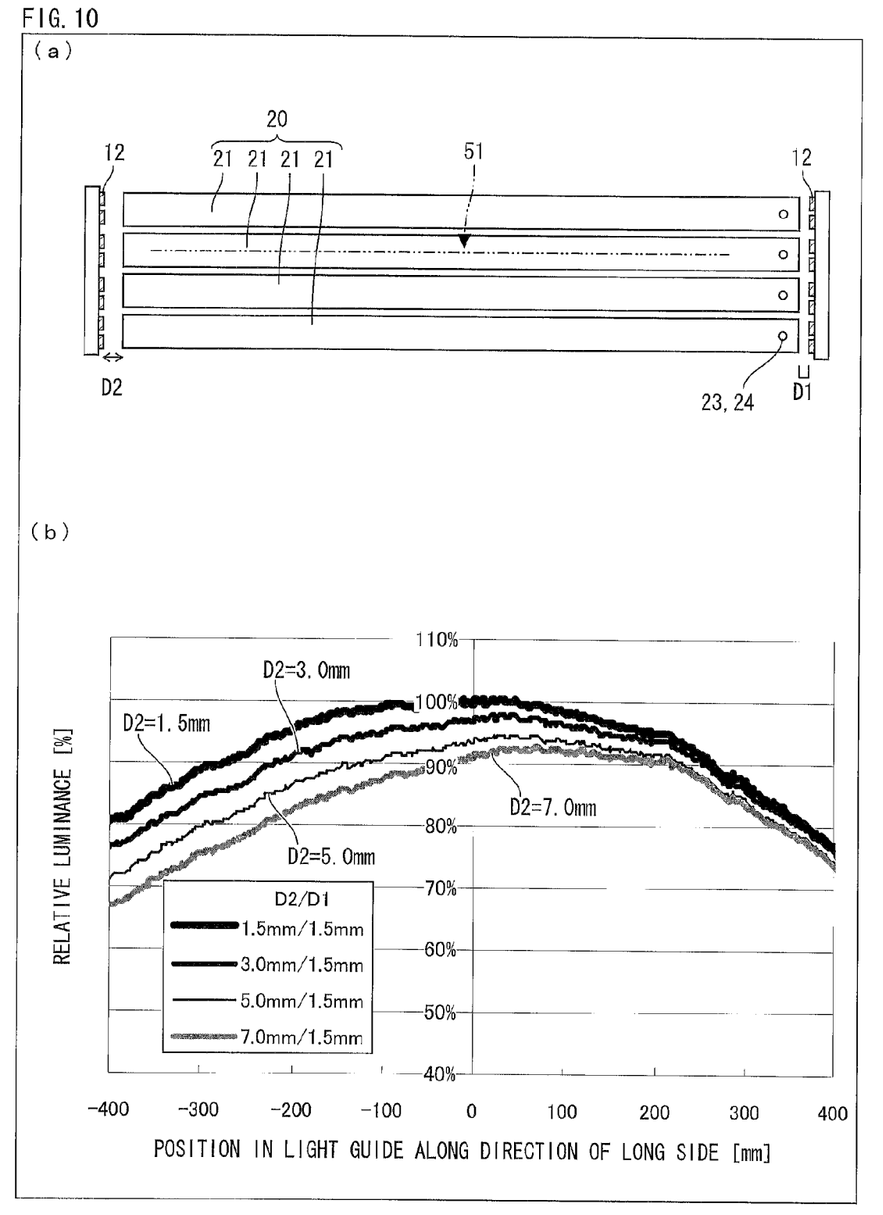

Meanwhile, according to FIG. 1, the through hole 23 is in one end portion of the light guide 21, whereas the guide 9 is provided to the other end portion. Expansion of the light guide 21 in the direction of the long side is absorbed on a side on which the guide 9 is provided. Therefore, the distance between an end portion of the light guide 21 and an LED light source 12 may differ between both ends (right and left ends) of the light guide 21. If this is the case, variations occur in optical coupling efficiency in the both end portions. In view of this, it is preferable that, in FIG. 1, in a case where the light guide 21 is divided into two equal halves arranged in the direction of the long side, a light path changing structure be denser in the other end portion side (left half) of the light guide 21 than in the one end portion side (right half) where the positioning pin 24 and the through hole 23 are located (refer to (b) of FIG. 10 (described later)). This makes it possible to achieve symmetrically distributed luminance in the emission surface (light output surface) 21d. Note here that the light path changing structure is for example a light output pattern formed by silk-screen printing or ink-jet printing of a diffusing material, by laser processing, from a molded prism, or the like.

Differences in optical coupling efficiency, which differences occur because the distance from an LED light source 12 to the light guide 21 is different between right and left, can be eliminated in the following manner. That is, it is possible to cause the number of light beams converged on each end face to be the same by controlling the number of light beams emitted from each LED light source 12. According to this configuration, even if the light path changing structure is provided symmetrically with respect to the direction of the short side the light guide 21, it is possible to achieve symmetrical distribution of luminance in the light output surface (emission surface). This is advantageous in that it is possible to easily design the light path changing structure (light output pattern).

Meanwhile, in a case where the light guide plate 20 is divided into a plurality of light guides 21 and the light guides 21 are arranged in parallel with the direction of the long side like the light source module 10, alignment between each LED light source 12 and the light guide 21 is important. For example, if an LED light source 12 provided so as to face an edge face 21a of a light guide 21 is displaced from the light guide 21, the optical coupling efficiency of the LED light source 12 to the light guide 21 decreases. As a result, the amount of light outputted from the light guide 21 through the emission surface 21d changes, and luminance unevenness occurs in the light source module 10 as a whole.

Further, in view of thermal expansion and manufacturing tolerances of each light guide 21, it is necessary to make a gap 22 between adjacent light guides 21. In addition, a gap between the LED light source 12 and the light guide 21 changes due to thermal expansion of the light guide 21 in the direction of the long side. As a result, the optical coupling efficiency, which indicates the amount of light beams that are emitted from the LED light source 12 and enter the light guide 21, significantly changes, and luminance unevenness occurs in the emission surface 21d of the light source module 10.

Such luminance unevenness occurs also in the light guide plates 110 and 210 described in respective Patent Literatures 1 and 2.

Specifically, according to the lighting device 100 described in Patent Literature 1, the light guide plate 110 is constituted by a plurality of light guides 111 (see FIG. 11). However, it is difficult to fasten each of the light guides 111. In view of this, according to Patent Literature 1, each of the light guides 111 is fastened with the hollow light guides (not illustrated), which are holding members for holding both ends of each of the light guides 111. In this configuration, it is not possible to control gaps between the light sources 101 and the light guide plate 110. Therefore, changes of the gaps between the light sources 101 and the light guide plate 110 cause significant changes in optical coupling efficiency. Such a change in optical coupling efficiency occurs in each of the light guides 111. As a result, in a flat light guide plate 110 constituted by the light guides 111, luminance significantly differs among the light guides 111.

On the other hand, according to the lighting device described in Patent Literature 2, the light guide plate 210 is constituted by a single (one) flat plate (see FIG. 12). Therefore, as the area of the light guide plate 210 becomes large, the small positioning hole 206 and the boss 207 provided to fasten the light guide plate 210 also become large. As a result, a light beam from the light source 201 is scattered at the small positioning hole 206. Then, the small positioning hole 206 looks like a bright spot or light beams are blocked from propagating to the light guide plate 210 beyond the small positioning hole 206. This causes significant luminance unevenness in the light guide plate 210.

It is possible to consider providing, to each light guide 111 described in Patent Literature 1, a small positioning hole 206 into which the boss 207 as described in Patent Literature 2 fits. However, in this case, the width of the light guide 111 in the direction of the short side is much smaller than that of the light guide plate 210. Therefore, in addition to the problems of luminance unevenness and bright spots caused by the small positioning hole 206, there also occurs a problem in which the small positioning hole 206 scatters light and causes a reduction in the amount of light emitted from the light emitting area 211 of the light guide plate 110.

As described above, the light guide plates 110 and 210 of respective Patent Literatures 1 and 2 have problems in which (i) luminance unevenness is caused by variations in gaps between the light sources 101 and the light guide plate 110 (light guides 111) and (ii) the small positioning hole 206 in the light guide plate 210 causes luminance unevenness and/or a bright spot and/or causes a lack of the amount of light emitted from the light guide plates 110 and 210.

In view of this, according to the present embodiment, the light guide 21 is designed to prevent also luminance unevenness. The following description discusses this design with reference to FIG. 5. (a) to (c) of FIG. 5 are plan views each illustrating an end portion of a light guide 21 and an LED light source(s) 12 of the light source module 10.

As described earlier, the light source module 10 is configured such that the light guide 21 is fastened to the chassis 2. Specifically, as illustrated in (a) of FIG. 5, the light guide 21 is fastened to the chassis 2 with the positioning pin 24, of the chassis 2, which fits in the through hole 23 of the light guide 21. This makes it possible to position the LED light source 12 and the light guide 21, and possible to provide the LED light source 12 at a certain distance from an end face 21a of the light guide 21.

Further, according to the present embodiment, the base of the positioning pin 24 fits in the through hole (groove) 25 of the reflector 14 which is fastened to the LED light source 12. That is, the present embodiment is configured such that the reflector 14 is positioned by means of the positioning pin 24. This makes it possible to position the LED light source 12 with respect to the positioning pin 24 provided to the chassis 2. Accordingly, it is possible to fasten the LED light source 12 and the light guide 21 to the chassis 2, while positioning the LED light source 12 and the light guide 21. That is, it is possible to position the LED light source 12 and the light guide 21 to the chassis 2 more accurately than fastening the LED light source 12 and the light guide 21 each individually to the chassis 2. This makes it possible to reduce variations in optical coupling efficiency of LED light sources 12 to light guides 21. As such, it is possible to reduce the occurrence of luminance unevenness.

Figure 5:
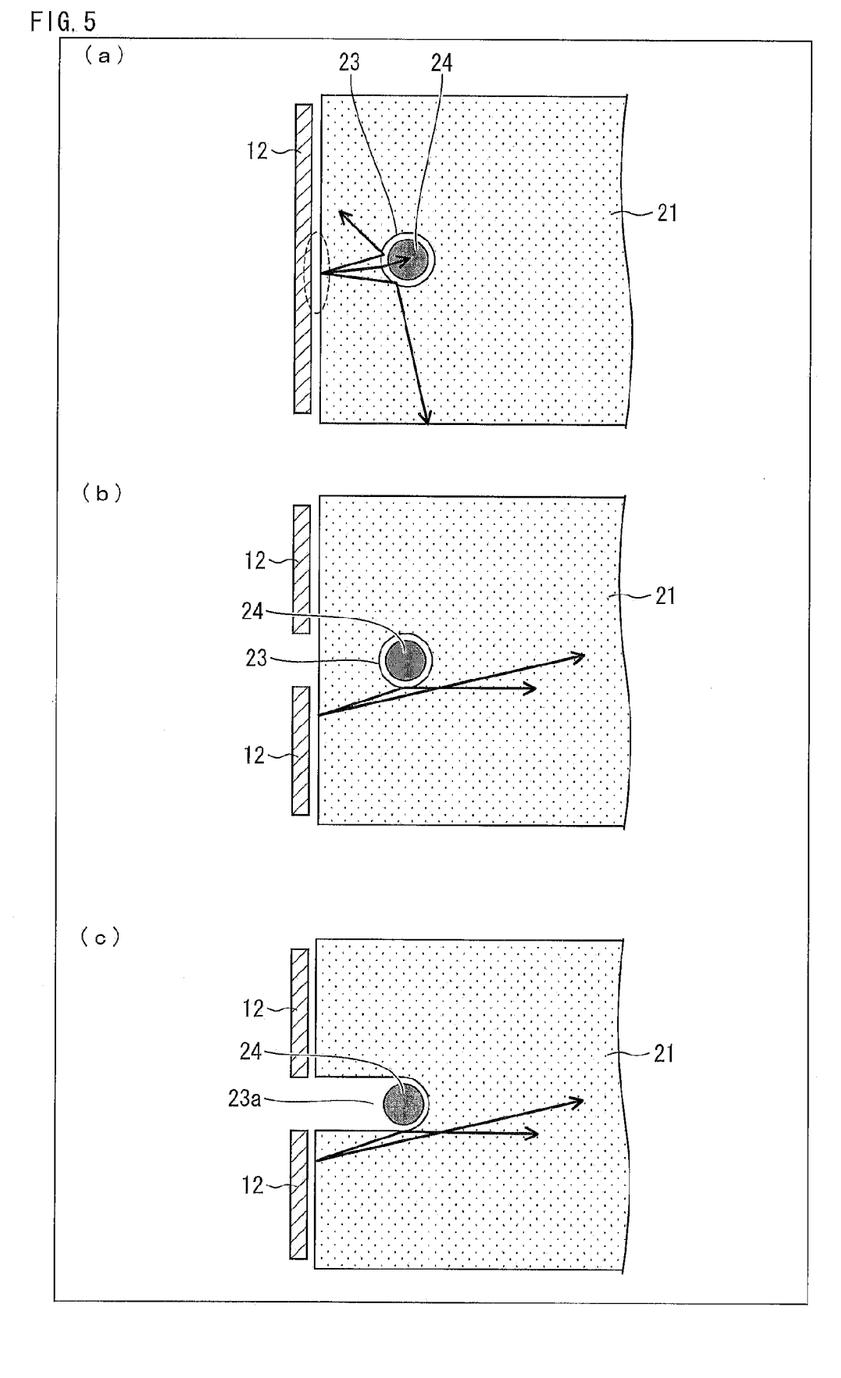

On the other hand, according to (a) of FIG. 5, a single LED light source 12 is provided so as to face an end face of the light guide 21. According to the configuration, the LED light source 12 is provided mainly on a line that extends in the direction of the long side of the light guide 21 from the through hole 23 of the light guide 21 (see broken lines in (a) of FIG. 5). In this case, light beams from a part, indicated by the broken lines, of the LED light source 12 are easily scattered by the through hole 23 and absorbed by the positioning pin 24, as indicated by the arrows in (a) of FIG. 5. That is, a particular light beam that is to propagate to the light guide 21 is scattered (bounces off). This results in luminance unevenness in light emitted from the light guide 21 through the emission surface (light output surface). Further, since light beams from the LED light source 12 are scattered at the through hole 23, there appears a bright spot in the vicinity of the through hole 23. This combines with absorption by the positioning pin 24 and causes a reduction in efficiency of light use at the emission surface.

In view of this, the arrangement shown in (b) of FIG. 5 is configured such that the LED light source 12 is provided so as not to overlap a line that extends in the direction of the long side of the light guide 21 from the through hole 23. That is, two LED light sources 12 are provided so as not to overlap this line (so that LED light sources 12 are separated by this line). In other words, two LED light sources 12 are provided so as to correspond to an end face of the light guide 21. This reduces the amount of light beams from the part indicated by broken lines in (a) of FIG. 5, i.e., the amount of light beams that cause luminance unevenness and a bright spot. That is, according to the configuration of (b) of FIG. 5, light beams are less scattered by the through hole 23 and less absorbed by the positioning pin 24. Accordingly, the light beams from the LED light source 12 are less scattered by the through hole 23 (or by the positioning pin 24). Further, it is possible to prevent a particular light beam that is to be propagated to the light guide 21 from being scattered at the through hole 23, and thus possible to allow the light beam to be emitted through the emission surface. That is, it is possible to suppress a reduction in efficiency of light use. This makes it possible to reduce the occurrence of luminance unevenness.

A gap between the two LED light sources 12 is preferably set to be larger than the diameter of the through hole 23. According to this configuration, even if the amount of light is smaller than that of (a) of FIG. 5 due to the division of the LED light sources 12, efficiency of light use is kept high provided that the through hole 23 is small and thus the amount of light beams scattered is small. In view of this, the size of the through hole 23 is preferably the minimum size necessary for achieving strengths required to hold and position the light guide 21.

Meanwhile, according to (a) and (b) of FIG. 5, the light guide 21 has the through hole 23 into which the positioning pin 24 fits. In this regard, it is only necessary that the light guide 21 have a part into which the positioning pin 24 fits. For example, as illustrated in (c) of FIG. 5, the light guide 21 can have a long hole 23a. The long hole 23a is in the form obtained by extending the through hole 23 in a direction toward the end face. The positioning pin 24 fits in an end portion (inner part) of the long hole 23a. Such a long hole 23a also makes it possible, in the same manner as in the through hole 23, to hold the light guide 21 in the direction of the short side such that the light guide 21 is restrained in the direction of the short side but not restrained in the direction of the long side. According to (c) of FIG. 5, the long hole 23a reaches an end face facing in the direction of the long side of the light guide 21. Note, however, that the long hole 23a does not have to reach the end face facing in the direction of the long side of the light guide 21, provided that the long hole 23a can tolerate expansion of the light guide 21.

Alternatively, a cylindrical groove not passing through to the top face of the light guide 21 or the like structure for positioning can be provided instead of the through hole 23. The top face of the light guide 21 is not opened as long as the positioning structure is a cylindrical groove that does not pass through the light guide 21. Therefore, light is guided through a larger area in the vicinity of the positioning pin 24, as compared to the case of the through hole 23. This reduces luminance unevenness around the positioning pin 24 and improves efficiency of light use.

As described above, according to (b) and (c) of FIG. 5, the LED light source 12 is provided so as not to overlap a line that extends in the direction of the long side of the light guide 21. This makes it possible to prevent a reduction in optical coupling efficiency of the LED light source 12 to the light guide 21, and to prevent a bright spot. Further, it is possible to reduce the effects of luminance unevenness caused by the through hole 23 of the light guide 21.

As illustrated in FIG. 12, the lighting device 200 of Patent Literature 2 uses, as a light source, a fluorescent tube such as a CCFL (cold-cathode fluorescent tube), which light source is not divided. Further, the specification of Patent Literature 2 does not describe dividing a light source. That is, the configuration of Patent Literature 2 is not encompassed in the configuration in which a light source is provided on a line that extends from the small positioning hole 206. Therefore, according to the lighting device 200 of Patent Literature 2, efficiency of light use is much lower than that of the light source module 10 of the present embodiment.

Figure 7:
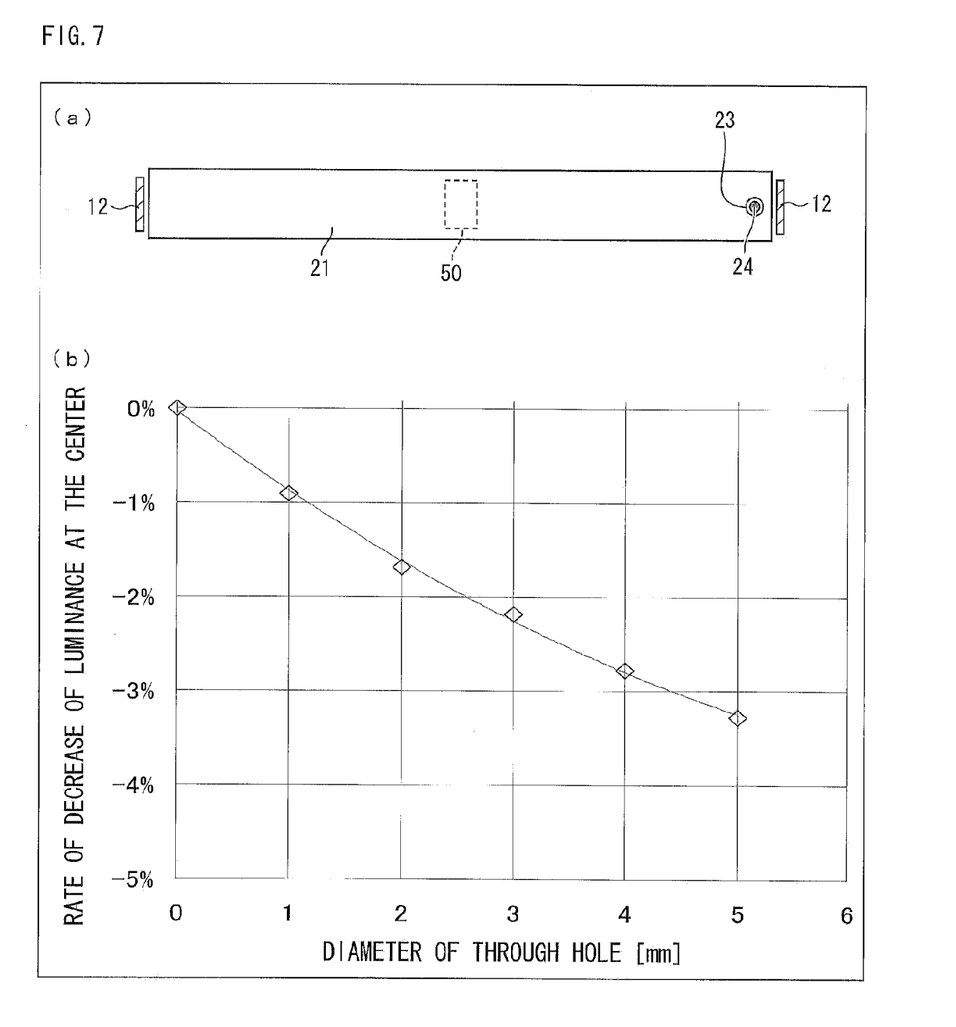
Figure 8:
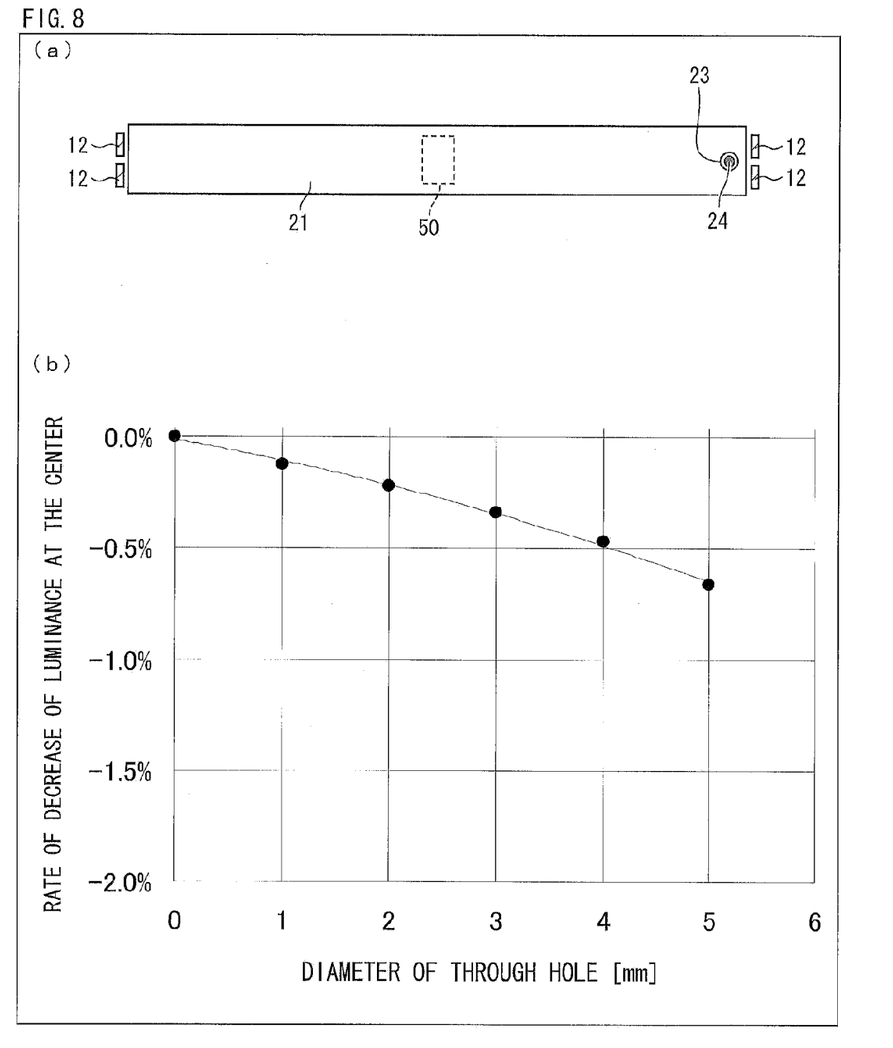

The following description discusses, with reference to FIGS. 7 and 8, the effect of luminance unevenness caused by a through hole 23 of a light guide 21 (or by a positioning pin 24 provided to the chassis 2). In each of FIGS. 7 and 8, (a) is a plan view illustrating part of the light source module 10, and (b) is a graph showing a relationship between the rate of decrease of luminance at the center of the light guide 21 of (a) and the diameter of the through hole 23 (diameter of positioning hole).

As illustrated in (a) of FIG. 7, a through hole 23 is made in a position at a distance of 5 mm from one end face of the light guide 21. The length of the light guide 21 in the direction of the long side is 1050 mm, and the length of the light guide 21 in the direction of the short side is 95 mm. LED light sources 12 are provided at both ends (along both short sides) of the light guide 21. Each of the LED light sources 12 is provided on a line that extends in the direction of the long side of the light guide 21 from the through hole 23. In other words, each of the LED light sources 12 is not separated by the line that extends in the direction of the long side of the light source 21 from the through hole 23. The positioning pin 24 is made from an absorber. Under this condition, simulation was carried out by a ray tracing method to observe the rate of decrease of luminance in a central area 50 of the light guide 21. (b) of FIG. 7 is a graph showing the results thereof. The graph shows the diameter (mm) of the through hole 23 and the rate (%) of decrease of luminance in the central area 50 of the light guide 21.

Assume that the diameter 2 mm of the through hole 23 serves as a reference in the graph shown in (b) of FIG. 7. When the diameter increases 1.5 times (becomes 3 mm), the rate of decrease of luminance in the central area 50 increases more than approximately 1.3 times. When the diameter increases 2.5 times (becomes 5 mm), the rate of decrease of luminance approximately doubles. That is, as the diameter of the through hole 23 of the light guide 21 becomes large, more of the light beam from the LED light source 12 is scattered at the through hole 23. As a result, luminance unevenness is likely to occur in the emission surface 21d of the light guide 21.

However, in consideration of the strength of the positioning pin 24, the diameter of the positioning pin 24 needs to be at least 2 mm. Therefore, the diameter of the through hole 23 is also preferably 2 mm.

On the other hand, (a) of FIG. 8 is different from (a) of FIG. 7 in how LED light sources 12 are arranged. The light guide 21 is the same both in (a) of FIG. 7 and (a) of FIG. 8. That is, according to (a) of FIG. 8, the LED light sources 12 are provided so as not to overlap a position on the line that extends in the direction of the long side of the light guide 21 from the through hole 23. In other words, the LED light sources 12 are separated by the line that extends in the direction of the long side of the light guide 21 from the through hole 23. This makes it possible to reduce the amount of light beams scattered by the through hole 23, which light beams are emitted from LED light sources 12 (see (b) of FIG. 8). That is, comparison between (b) of FIG. 7 and (b) of FIG. 8 shows that, in the case of (b) of FIG. 8, the rate of decrease of luminance in the central area 50 is moderate even if the diameter of the through hole 23 is large. In addition, the amount of light scattered at the through hole 23 is also reduced. That is, it is possible to obtain a light source module 10 that reduces luminous unevenness by reducing the amount of light scattered by the through hole 23.

Figure 9:
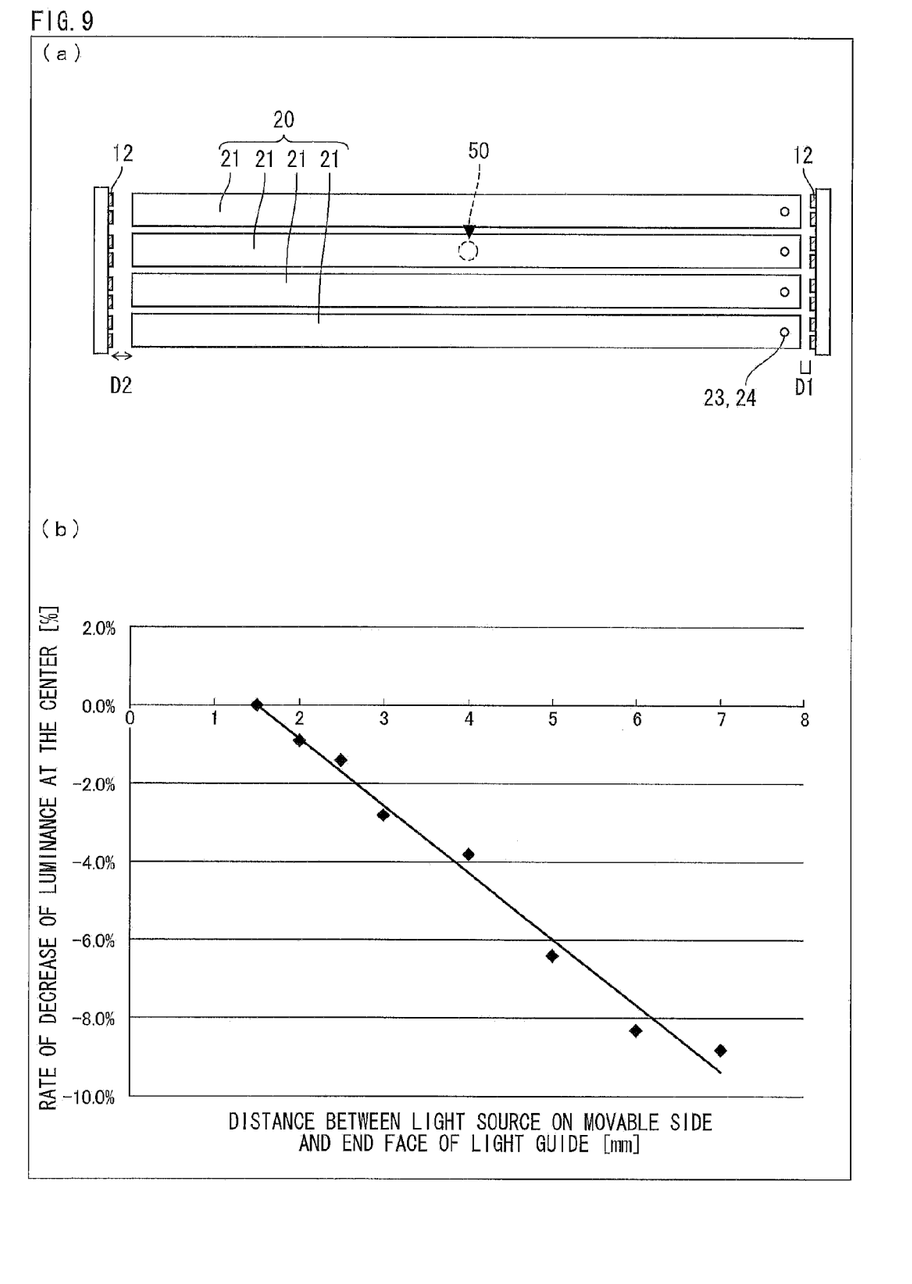

The following description discusses, with reference to FIGS. 9 and 10, the effect of luminance unevenness observed when optical coupling efficiency is different between both ends because the distances from the light guide 21 to the LED light sources 12 are different between both ends. (a) of FIG. 9 is a plan view illustrating part of the light source module 10. (b) of FIG. 9 is a graph showing a relationship between (i) an end face of the light guide 21 on a side on which the positioning pin 24 of the light guide 21 shown in (a) of FIG. 9 is not provided and (ii) an LED light source 12. (a) of FIG. 10 is a plan view illustrating part of the light source module 10. (b) of FIG. 10 is a graph showing a relationship between (I) the rate of decrease of luminance at a center, along the direction of the long side, of the light source 21 shown in (a) of FIG. 10 and (II) the distance between the LED light source 12 and the light guide 21.

As illustrated in (a) of FIG. 9, the distance D1 between (i) an LED light source 12 (at right in (a) of FIG. 9) that is closer to the through hole 23 and the positioning pin 24 and (ii) an end face of a light guide 21 is fixed at 1.5 mm. Then, the distance D between an LED light source 12 on the opposite side and the other end face of the light guide 21 is changed from 1.5 mm to 7 mm. Note that the length of the light guide 21 in the direction of the long side is 1050 mm, and the length in the direction of the short side is 95 mm. The LED light sources 12 are provided at both ends (along both short sides) of the light guide 21. Further, no LED light source 12 exists in a position on a line that extends in the direction of the long side of the light guide 21 from the through hole 23. In other words, LED light sources 12 are separated by the line that extends in the direction of the long side of the light guide 21 from the through hole 23. Further, a light path changing structure for causing a light beam to be emitted through the emission surface (light output surface) 21d is formed by silk-screening a diffusing material. The light path changing structure is provided symmetrically with respect to the direction of the long side of the light guide 21. Under this condition, the rate of decrease of luminance in the central area 50 of the light guide 21 was measured by a two-dimensional luminance meter (CA-2000: manufactured by Konica Minolta). (b) of FIG. 9 is a graph showing the results thereof. The graph shows the distance D2 versus the rate (%) of decrease of luminance in the central area 50 of the light guide 21.

Assume that, as shown in (a) of FIG. 9, the distance D2 of 1.5 mm between (i) an LED light source 12 on the side on which the distance D2 is changed and (ii) an end face of the light guide 21 serves as a reference. The luminance in the central area 50 decreases in proportion to the distance. When the distance D2 doubles (becomes 3 mm), the rate of decrease of luminance becomes approximately 3%. When the distance D2 quadruples (becomes 6 mm), the rate of decrease of luminance becomes approximately 8%.

On the other hand, as shown in (a) of FIG. 10, luminance distribution in the direction 51 of the long side of the light guide 21 was measured under the conditions of (a) of FIG. 9. (b) of FIG. 10 is a graph showing the results thereof. The graph shows relative luminances on the right and left sides of the light guide 21, observed when it is assumed that the center of the light guide 21 along the direction of the long side is "0 mm". Note that (b) of FIG. 10 is normalized such that the luminance at the center observed when the distance D2 between the LED light source 12 and the end face of the light guide 21 is 1.5 mm is 100%.

(b) of FIG. 10 shows the following. Although the luminance distribution is made uniform by providing the light path changing structure symmetrically with respect to the direction of the long side of the light guide 21, symmetry of the luminance distribution starts being destroyed when the distance D2 doubles (becomes 3 mm). As the distance D2 further increases, the symmetry of the luminance distribution is significantly destroyed.

That is, by increasing the density of the light path changing structure to compensate for luminance decrease caused by an increase in the distance D2 between the LED light source 12 and the end face of the light guide 21, it is possible to achieve symmetry of the luminance distribution in the emission surface (light output surface) 21d. For example, it is possible to finely control the luminance distribution by constituting the light path changing structure by for example a light output pattern formed by silk-screen printing or ink-jet printing of a diffusing material, by laser processing, from a molded prism, or the like.

Further, by increasing the number of light beams emitted from the LED light source 12 to compensate for luminance decrease caused by an increase in the distance D2 between the LED light source 12 and the light guide 21, it is possible to achieve symmetry of light beams coupled to the light guide 21. Accordingly, it is possible to keep symmetry of the luminous distribution in the emission surface (light output surface) 21d even if the light path changing structure is symmetric with respect to the direction of the long side of the light guide 21.

The present invention can also be expressed as below.

[1] A light source module including: a light source; and a light guide having a light path changing structure for emitting, through a light output surface, a light beam emitted from the light source and entered the light guide through an end portion on a short side, the light source module including a plurality of the light sources and a plurality of the light guides accommodated in a housing, wherein positioning structures are provided to the housing and in the vicinity of an end portion on one short side of the light guide, which positioning structures position the light guide and the light source and restrain the light guide in the directions of short and long sides, and, in the vicinity of an end portion on the other short side, the light guide is restrained only in the direction of the short side.

[2] The light source module as set forth in [1] wherein the positioning structures are a protruding part provided to the housing and a through hole in the vicinity of the end portion on the short side of the light guide, which protruding part fits in the through hole.

[3] The light source module as set forth in [2], wherein the protruding part provided to the housing fits in a through hole of a reflector surrounding the light source and thereby positions the light source and the light guide.

[4] The light source module as set forth in [2], wherein the light source is divided by a line that extends in the direction of the long side of the light guide from the through hole of the light guide.

[5] The light source module as set forth in [4], wherein a substrate on which the light source is mounted is fastened to part, of the housing, which is on a line that extends in the direction of the long side from the through hole of the light guide.

[6] The light source module as set forth in any one of [1] through [5], wherein light beams from light sources enter the light guide through end portions on the both short sides.

[7] The light source module as set forth in [6], wherein the light guide is configured such that the distance from the end face of an end portion on one short side to the nearest light source, in which end portion there is the positioning structure, is shorter than the distance from the other end face of an end portion on the other short side to the opposite light source.

[8] The light source module as set forth in [7], wherein, in a case where the light guide is divided into two equal halves arranged in the direction of the long side, the light path changing structure is denser on the side on which the distance from the end face of the end portion on the short side to the nearest light source is longer, than on the other side.

[9] The light source module as set forth in [7], wherein the light source on a side on which the distance from the end face of the end portion on the short side to the light source is longer emits more light beam(s) than the opposite light source.

[10] An electronic apparatus including a light source module as set forth in any one of [1] to [9].

The light source module of the present invention can be expressed as below. That is, the light source module includes: a light guide plate; and a light source section including a light source for emitting a light beam and allowing the light beam to enter the light guide plate, wherein the light guide plate (i) has a light path changing structure for emitting, through a light output surface, a light beam emitted from the light source and entered the light guide plate through at least one end face facing in a direction of a long side and (ii) has a positioning part for positioning the light source and the light guide plate, the light source module including a restraining part provided to one longitudinal end portion of the light guide plate, which restraining part restrain the light guide only in the direction of the short side.

The light source module of the present invention can be expressed as below. That is, the light source module includes: a light source; and a light guide having a positioning hole (through hole) for positioning in the vicinity of a light introduction edge, wherein the light guide is positioned by the positioning hole and a positioning member at least with respect to a direction parallel with a direction in which light it introduced, and the light source is divided by a line that extends from the positioning hole and is normal to the light introduction edge.

According to the light source module of the present invention, for tolerance of expansion of the light guide caused by temperature changes and/or moisture absorption, it is necessary to create clearance between the light source and the light introduction edge of the light guide. If the position of the light guide is not set when the clearance is created, backlash occurs. This results in changes in luminance distribution and optical coupling efficiency, thereby causing variations in optical characteristics of the light source module. To address this, in order to position the light source and the light guide, it is necessary to pin the light guide. However, a positioning hole and a pin absorb and/or scatter light, thereby causing a reduction in efficiency of light use and luminance unevenness in the vicinity of a positioning structures (positioning hole and pin).

In this regard, according to the foregoing configuration, a positioning hole is made in an end portion (for example at a distance of several millimeters from one end) of the light guide, and the light guide is fastened by a positioning pin. This makes it possible to keep the distance from the light source to the light introduction edge of the light guide constant, and thus possible to reduce variations in optical characteristics of the light source module. Further, the light source is divided so that no light source is provided behind the positioning hole and the pin. This makes it possible to reduce scattering, by the positioning hole and the pin, of a light beam from the light source. As such, it is possible to prevent a reduction in efficiency of light use.

Since (i) the positioning structures constituted by the positioning hole in the form of a hole made by a borer and the pin that fits in the positioning hole are provided and (ii) the light source is divided like above, it is possible to position the light guide without luminance unevenness caused by the pin. As such, it is possible to minimize the effects of the positioning structure on luminance distribution.

Note that, the smaller the diameter of the positioning hole, the lower the rate of decrease of luminance at the center of the light guide will be. However, it is necessary to also ensure strength of the positioning pin. Therefore, the diameter of the positioning hole is set to 2 mm. The simulation shows that, when the diameter is 2 mm, the rate of decrease of luminance at the center is equal to or lower than 2%. This is a level that does not significantly affect luminance distribution.

As has been described, a light source module of the present invention is configured such that: there is a positioning part in the light guide plate, which positioning part is for positioning the light source and the light guide plate; and a restraining part is provided to a longitudinal end portion of the light guide plate, which restraining part restrains only movement in the direction of the short side of the light guide plate. Further, an electronic apparatus of the present invention includes the light source module. Therefore, it is possible to provide a light source module capable of reducing warping and cracking caused by expansion of a light guide plate and an electronic apparatus including the light source module.

The light source module of the present invention is preferably configured such that the positioning part is in one longitudinal end portion of the light guide plate.

According to the configuration, the positioning part of the light guide plate is in a longitudinal end portion of the light guide plate. This fastens the light guide plate at its end portion in which there is the positioning part. Accordingly, in this end portion, the distance from a light source to the end face of the light guide is kept constant. As a result, it is possible to prevent a reduction in optical coupling efficiency of the light source to the light guide. As such, it is possible to reduce the occurrence of luminance unevenness.

The light source module of the present invention is preferably configured such that the restraining part is provided to the other longitudinal end portion of the light guide plate.

According to the configuration, there is the positioning part in one longitudinal end portion of the light guide plate, and there is the restraining part in the other end portion. This makes the distance from a light source to the end face of the light guide plate constant in the end portion of the light guide plate, in which end portion there is the positioning part. On the other hand, in the end portion of the light guide plate in which end portion there is the restraining part, expansion of the light guide plate is sufficiently absorbed. This makes is possible to keep good optical coupling efficiency and to suppress variations in optical coupling efficiency.

The light source module of the present invention preferably further includes a housing for accommodating the light guide plate and the light source, the housing being provided with a protruding part that fits in both the positioning part of the light guide plate and the light source section.

According to the configuration, the protruding part provided to the housing fits in both the positioning part of the light guide plate and the light source section. Therefore, it is possible to fasten the light source and the light guide plate to the housing, while positioning the light source and the light guide plate. That is, it is possible to position the light source and the light guide plate more accurately than when each independently fastening the light source and the light guide plate. Accordingly, it becomes possible to reduce variations in optical coupling efficiency of the light sources to the light guide plate. As such, it is possible to reduce occurrence of luminance unevenness.

The light source module of the present invention is preferably configured such that the light source is provided so as not to overlap a line that extends in a direction of a long side of the light guide plate from the positioning part of the light guide plate.

According to the configuration, no light source is provided on the line that extends in the direction of long side of the light guide plate from the positioning part of the light guide plate. This makes it possible to suppress scattering of light beams by the positioning part, which light beams are emitted from the light source. Accordingly, it is possible to reduce occurrence of luminance unevenness.

The present invention is not limited to the descriptions of the respective embodiments, but may be altered within the scope of the claims. That is, an embodiment derived from a combination of technical means appropriately altered within the scope of the claims is encompassed in the technical scope of the invention

INDUSTRIAL APPLICABILITY

The present invention relates to (i) a light source module including a side edge-type light guide plate for emitting, in the form of a plane, light from a light source and (ii) an electronic apparatus including the light source module. The present invention is applicable to for example a light source module such as a backlight and to an electronic apparatus such as a liquid crystal display device.

REFERENCE SIGNS LIST

1 Liquid crystal display device (electronic apparatus)
2 Chassis (housing)
9 Guide (restraining part)
10 Light source module
12 LED light source (light source)
12a LED (light source)
20 Light guide plate
21 Light guide
21a End face
21d Emission surface (light output surface)
23 Through hole (positioning part)
24 Positioning pin (protruding part)

The invention claimed is:

1. A light source module comprising:
a light source section including a light source; and
a light guide plate for receiving a light beam from the light source through an end face and guiding the light beam,
the light guide plate having a positioning part for positioning the light source and the light guide plate,
the light source module further comprising a restraining part for restraining the light guide plate only in a direction of a short side.

2. The light source module according to claim 1, wherein the positioning part is in one longitudinal end portion of the light guide plate.

3. The light source module according to claim 2, wherein the restraining part is provided to the other longitudinal end portion of the light guide plate.

4. The light source module according to claim 1, further comprising a housing for accommodating the light guide plate and the light source, the housing being provided with a protruding part that fits in both the positioning part of the light guide plate and the light source section.

5. The light source module according to claim 1, wherein the light source is provided so as not to overlap a line that extends in a direction of a long side of the light guide plate from the positioning part of the light guide plate.

6. The light source module according to claim 3, wherein light sources are provided so as to face both end faces, which face in a direction of a long side, of the light guide plate.

7. The light source module according to claim 6, wherein:
the light guide plate has a light path changing structure for emitting, through a light output surface, light beams emitted from the light sources and entered the light guide plate through the both end faces;
a distance (D2) is longer than a distance (D1), the distance (D1) being a distance from one of the both end faces of the light guide plate to a first light source facing said one of the both end faces, said one of the both end faces being on the positioning part-side, and the distance (D2) being a distance from the other of the both end faces of the light guide to a second light source facing the other of the both end faces, the other of the both end faces being on the restraining part-side; and
in a case where the light guide plate is divided into equal halves arranged in the direction of the long side, the light path changing structure is denser on the restraining part-side than on the positioning part-side.

8. The light source module according to claim 6, wherein:
the light guide plate has a light path changing structure for emitting, through a light output surface, light beams emitted from the light sources and entered the light guide plate through the both end faces;
a distance (D2) is longer than a distance (D1), the distance (D1) being a distance from one of the both end faces of the light guide plate to a first light source facing said one of the both end faces, said one of the both end faces being on the positioning part-side, and the distance (D2) being a distance from the other of the both end faces of the light guide to a second light source facing the other of the both end faces, the other of the both end faces being on the restraining part-side; and
the second light source emits more light beam(s) than the first light source does.

9. The light source module according to claim 1, wherein:
the light guide plate is constituted by a plurality of light guides; and
the plurality of light guides are arranged in parallel with a direction of a long side with a gap between adjacent ones of the plurality of light guides.

10. An electronic apparatus comprising a light source module set forth in claim 1.

* * * * *